(12) United States Patent
Callaghan et al.

(10) Patent No.: US 8,473,789 B2
(45) Date of Patent: Jun. 25, 2013

(54) MEMORY LEAK MONITORING SYSTEM AND ASSOCIATED METHODS

(75) Inventors: Patrick J. Callaghan, Vestal, NY (US); Thomas B. Mathias, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/563,186

(22) Filed: Sep. 21, 2009

(65) Prior Publication Data
US 2011/0072299 A1 Mar. 24, 2011

(51) Int. Cl.
*G06F 11/00* (2006.01)
(52) U.S. Cl.
USPC .............................. 714/47.1; 714/42
(58) Field of Classification Search
USPC ............. 714/47.2, 26, 33, 37, 38.1, 38.11, 714/38.12, 38.13, 38.14, 47.1, 47.3, 42; 717/124–135; 711/170, 173
See application file for complete search history.

(56) References Cited

U.S. PATENT DOCUMENTS

| | | | |
|---|---|---|---|
| 6,519,637 B1 * | 2/2003 | Arkeketa et al. ............. 709/223 |
| 7,257,692 B2 | 8/2007 | Schumacher ................. 711/170 |
| 7,398,369 B2 | 7/2008 | Dickenson .................... 711/170 |
| 8,037,477 B2 * | 10/2011 | Findeisen et al. ............ 718/104 |
| 2005/0076184 A1 * | 4/2005 | Schumacher ................ 711/170 |
| 2005/0235127 A1 | 10/2005 | Muthiah et al. .............. 711/170 |
| 2006/0206885 A1 * | 9/2006 | Seidman et al. .............. 717/148 |
| 2006/0253845 A1 * | 11/2006 | Achanta et al. .............. 717/151 |
| 2006/0277440 A1 * | 12/2006 | Minshall et al. ................ 714/38 |
| 2007/0067758 A1 * | 3/2007 | Findeisen et al. ............ 717/140 |
| 2007/0101202 A1 * | 5/2007 | Garbow ......................... 714/47 |
| 2008/0072007 A1 | 3/2008 | Zagatta ......................... 711/170 |
| 2010/0211754 A1 * | 8/2010 | Crosby et al. ................ 711/170 |

OTHER PUBLICATIONS

Stander, Philip; "Performance Comparison Between The HPUX 11i Multi-Arena Memory Management Module and The Memory Tuning System (MTS) from NewCode Inc.", Globe TOM and NewCode Inc., pp. 1-27 (2004).
T. B. Mathias et al, "Autonomic Computing and IBM System Z10 Active Resource Monitoring", IBM J. Res. & Dev., vol. 53 No. 1 Paper 13 (2009).

* cited by examiner

*Primary Examiner* — Scott Baderman
*Assistant Examiner* — Joseph Kudirka
(74) *Attorney, Agent, or Firm* — Dennis Jung; Ido Tuchman

(57) ABSTRACT

A system to check for memory leaks in storage may include a data processing application executing via a computer processor, and storage to store data generated by the data processing application. The system may also include a monitor executing via the computer processor that checks the storage over different time intervals in order to identify a particular sized memory leak in the storage based upon each time interval's length.

14 Claims, 7 Drawing Sheets

US 8,473,789 B2

MEMORY LEAK MONITORING SYSTEM AND ASSOCIATED METHODS

BACKGROUND OF THE INVENTION

1. Field of the Invention

The invention relates to the field of computer systems, and, more particularly, to memory leak detection in such.

2. Description of Background

Programming bugs may result in memory leaks and as a result of these memory leaks, the system running programs leaking memory do not run as well as they can, or sometimes, not very well at all. The detection of these leaks as they are happening and before the system becomes unstable, is important.

The accurate detection of a memory leak is not always easy. In addition, the detection of memory leaks, without false positives, is important for a system, especially one that is striving to become an autonomic element within the autonomic computing architecture.

SUMMARY OF THE INVENTION

According to one embodiment of the invention, a system to check for memory leaks in storage may include a data processing application executing via a computer processor, and storage to store data generated by the data processing application. The system may also include a monitor executing via the computer processor that checks the storage over different time intervals in order to identify a particular sized memory leak in the storage based upon each time interval's length.

The monitor may use a short time interval to identify large sized memory leaks, an intermediate time interval to identify medium sized memory leaks, and/or a long time interval to identify small sized memory leaks. The monitor may collect historical data for comparison with future data of a respective time interval to determine if a memory leak exists.

The monitor may check based upon a threshold for the storage being used. The monitor may enable the threshold to be configurable. The storage may include random access memory, swap space, real memory, and/or virtual memory.

The monitor may check that a total amount of free space in the swap space is below its respective threshold and/or that total swap size is above its respective threshold. The monitor may report an error when a first threshold is crossed, and terminate the data processing application's process when a second threshold is crossed.

The threshold may be a percentage of the storage. The threshold may be tailored for each process of the data processing application.

Another aspect of the invention is a method to detect memory leaks. The method may include storing data generated by a data processing application in computer readable memory. The method may also include checking, via a monitor, the computer readable memory over different time intervals in order to identify a particular sized memory leak in the computer readable memory based upon each time interval's length.

The method may further include using at least one of a short time interval to identify large sized memory leaks, an intermediate time interval to identify medium sized memory leaks, and a long time interval to identify small sized memory leaks. The method may additionally include collecting historical data for comparison with future data of a respective time interval to determine if a memory leak exists.

The method may also include checking that at least one of a total amount of free space in the swap space is above its respective threshold and that total swap size is above its respective threshold. The method may further include reporting an error when a first threshold is crossed, and terminating the data processing application's process when a second threshold is crossed. The method may additionally include tailoring for each process of the data processing application a threshold.

Another aspect of the invention is a computer readable program codes coupled to tangible media that may detect memory leaks. The computer readable program codes may be configured to cause the program to store data generated by a data processing application in storage. The computer readable program codes may also check with a monitor the storage over different time intervals in order to identify a particular sized memory leak in the storage based upon each time interval's length.

DETAILED DESCRIPTION OF THE INVENTION

Figure 1:
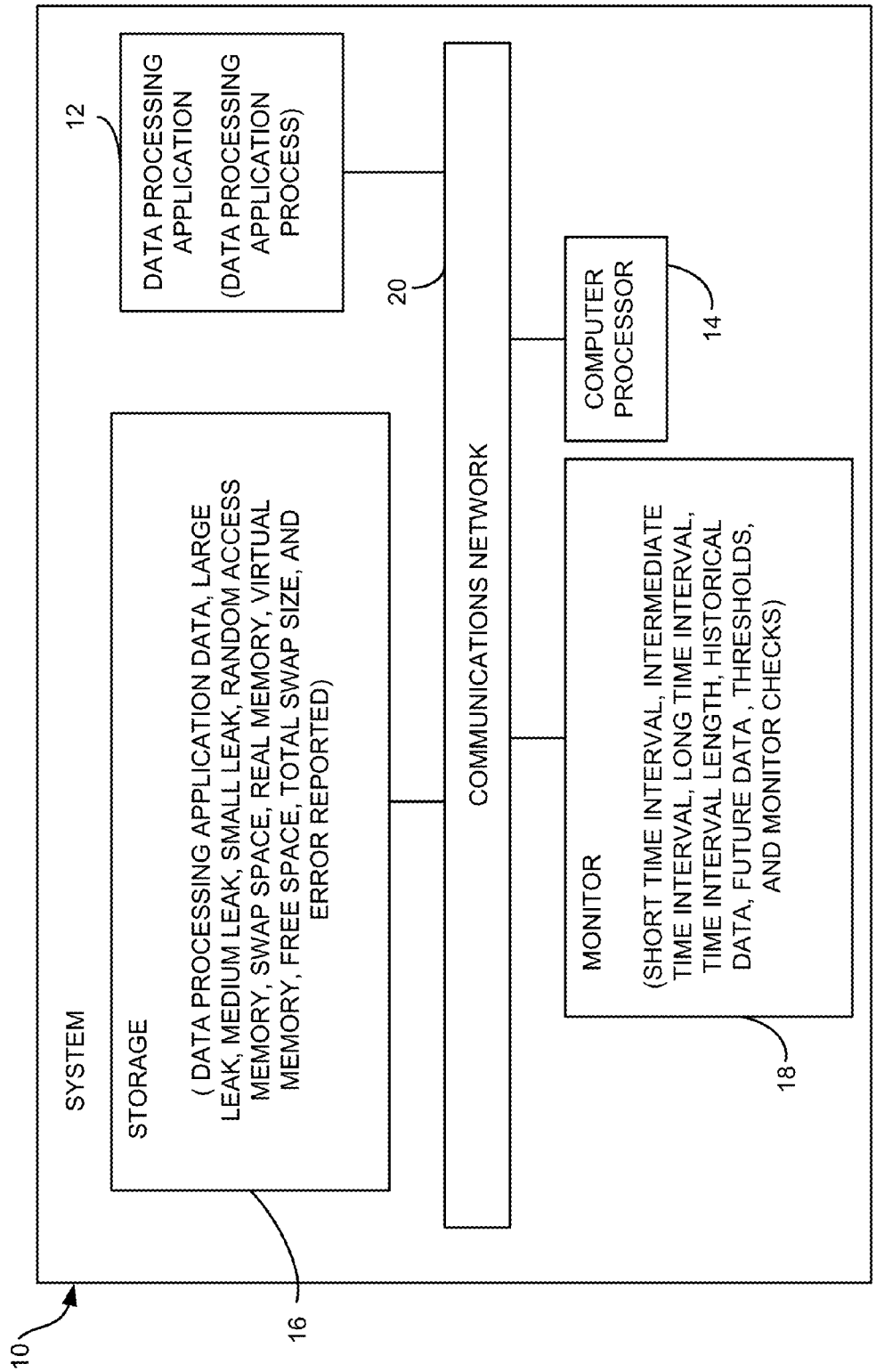
FIG. 1 is a schematic block diagram of a system to detect memory leaks in accordance with the invention.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium (also referred to herein as storage and computer readable memory) may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a system 10 to check for memory leaks (also referred to herein as simply "leaks") in storage, e.g. computer memory or the like, is initially described. The system 10 is a programmable apparatus that stores and manipulates data according to an instruction set as will be appreciated by those of skill in the art.

The system 10 includes a communications network 20 that is wired and/or wireless, for example. The communications network 20 is local and/or global with respect to system 10, for instance.

In one embodiment, the system 10 includes a data processing application 12 executing via a computer processor 14. Examples of data processing applications are word processing programs, spreadsheet programs, and various other computer programs.

In one embodiment, the system 10 includes storage 16, such as computer readable memory, to store data generated by the data processing application 12. In another embodiment, the system 10 also includes a monitor 18 executing via the computer processor 14 that checks the storage 16 over different time intervals in order to identify a particular sized memory leak in the storage based upon each time interval's length. For instance, the monitor 18 uses a short time interval to identify large sized leaks, an intermediate time interval to identify medium sized leaks, and/or a long time interval to identify small sized leaks.

In one embodiment, the monitor 18 collects historical data for comparison with future data of a respective time interval to determine if a leak exists.

In another embodiment, the monitor 18 checks are based upon a threshold for the storage 16 being used. In one embodiment, the monitor 18 enables the threshold to be configurable. In another embodiment, the storage 16 includes random access memory, swap space, real memory, and/or virtual memory.

In one embodiment, the monitor 18 checks that a total amount of free space in the swap space is above its respective threshold and/or that total swap size is above its respective threshold. In another embodiment, the monitor 18 reports an error when a first threshold is crossed, and terminates the data processing application's process when a second threshold is crossed.

In one embodiment, the threshold is a percentage of the storage 16. In another embodiment, the threshold is tailored for each process of the data processing application 12.

Figure 2:
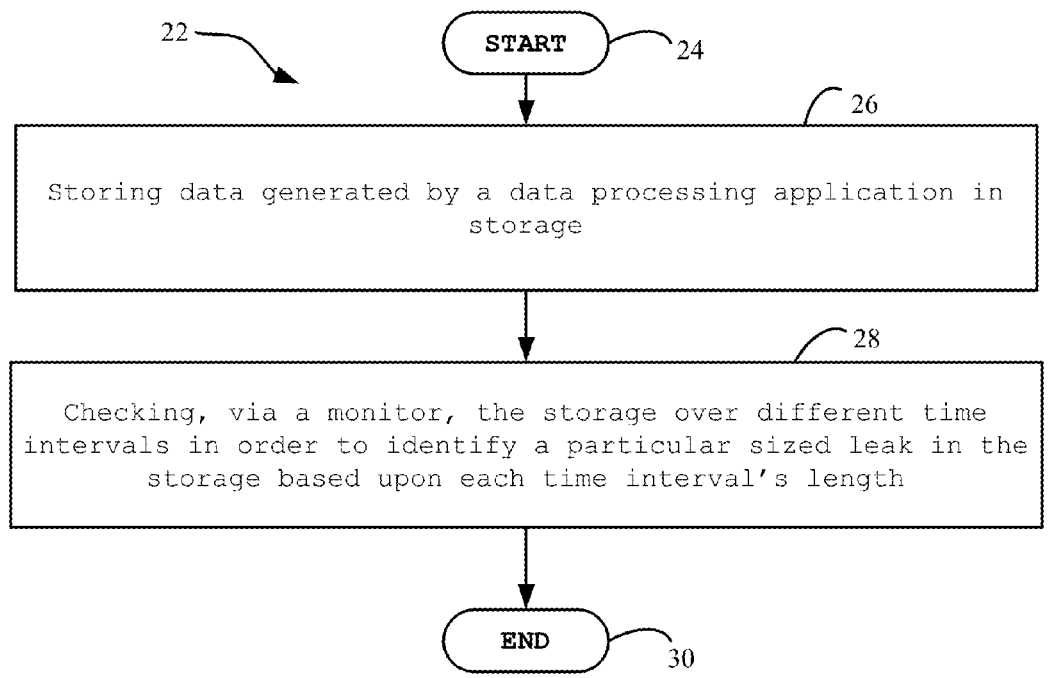
FIG. 2 is a flowchart illustrating method aspects according to the invention.

Another aspect of the invention is a method to detect memory leaks in system 10, which is now described with reference to flowchart 22 of FIG. 2. The method begins at Block 24 and may include storing data generated by a data processing application in storage. The method may also include checking, via a monitor, the storage over different time intervals in order to identify a particular sized leak in the storage based upon each time interval's length at Block 28. The method ends at Block 30.

Figure 3:
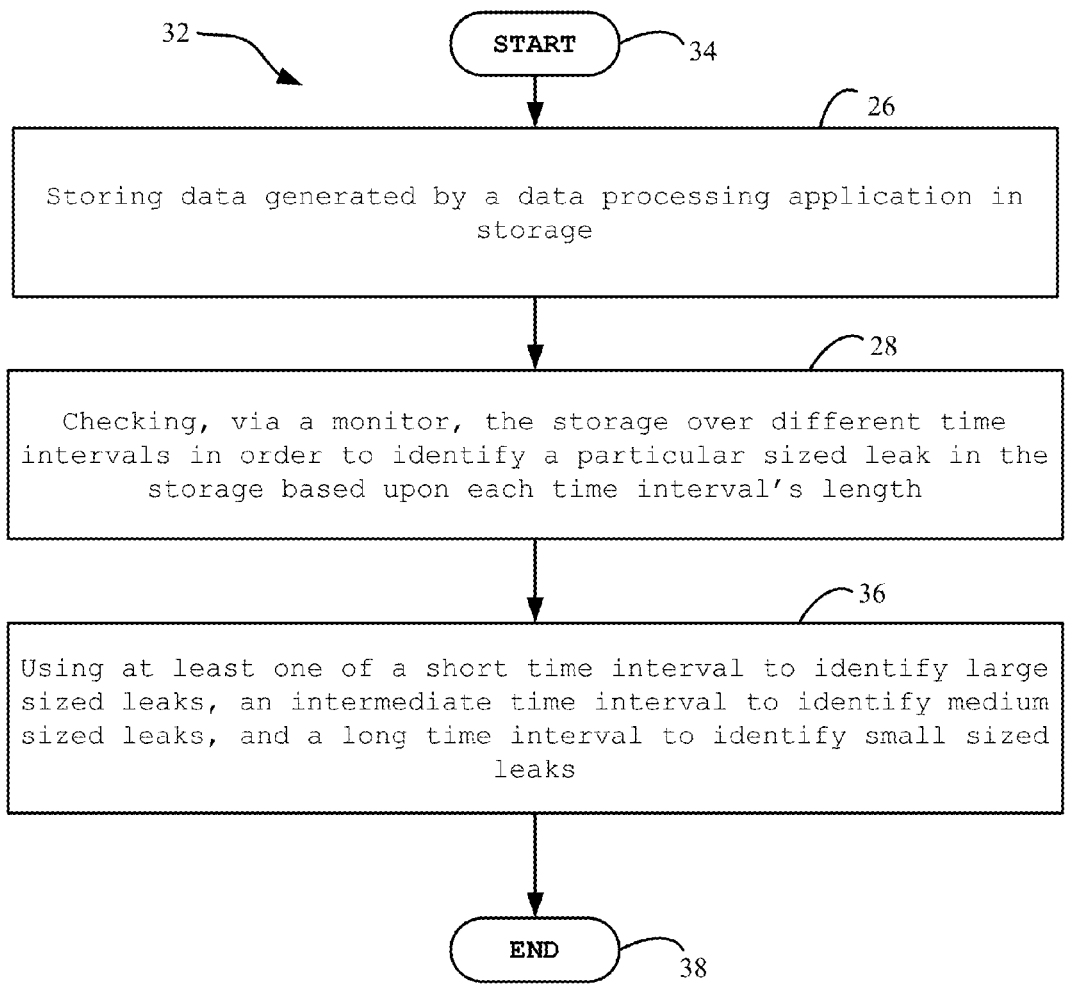
FIG. 3 is a flowchart illustrating method aspects according to the method of FIG. 2.

In another method embodiment, which is now described with reference to flowchart 32 of FIG. 3, the method begins at Block 34. The method may include the steps of FIG. 2 at Blocks 26 and 28. The method may additionally include using at least one of a short time interval to identify large sized leaks, an intermediate time interval to identify medium sized leaks, and a long time interval to identify small sized leaks at Block 36. The method ends at Block 38.

Figure 4:
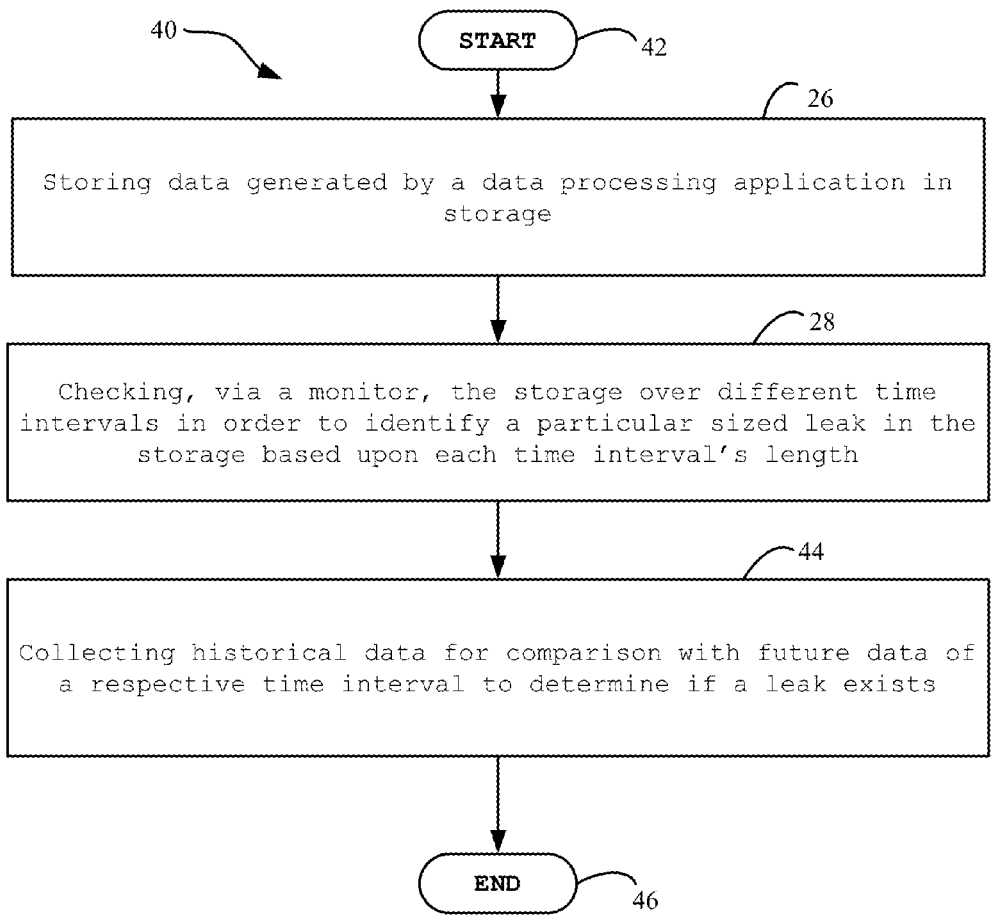
FIG. 4 is a flowchart illustrating method aspects according to the method of FIG. 2.

In another method embodiment, which is now described with reference to flowchart 40 of FIG. 4, the method begins at Block 42. The method may include the steps of FIG. 2 at Blocks 26 and 28. The method may additionally include collecting historical data for comparison with future data of a respective time interval to determine if a leak exists at Block 44. The method ends at Block 46.

Figure 5:
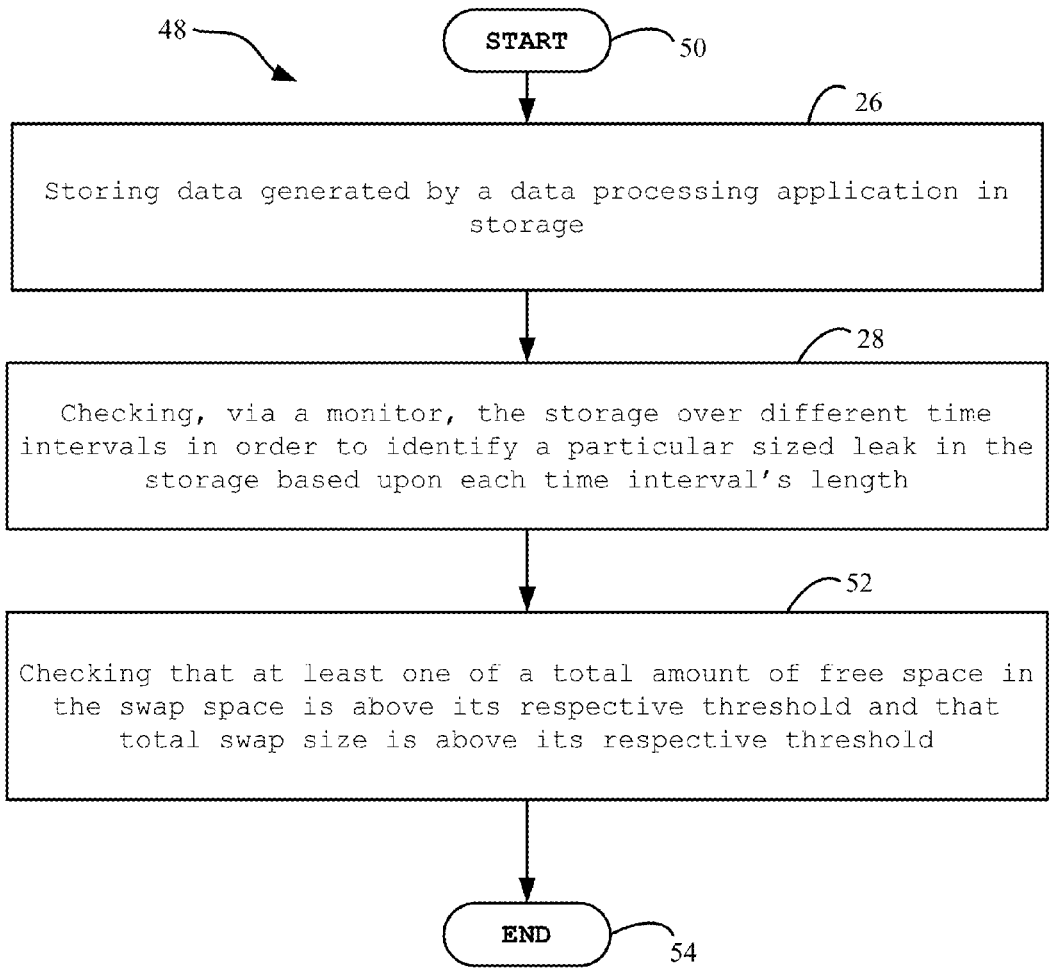
FIG. 5 is a flowchart illustrating method aspects according to the method of FIG. 2.

In another method embodiment, which is now described with reference to flowchart 48 of FIG. 5, the method begins at Block 50. The method may include the steps of FIG. 2 at Blocks 26 and 28. The method may additionally include checking that at least one of a total amount of free space in the swap space is above its respective threshold and that total swap size is above its respective threshold at Block 52. The method ends at Block 54.

Figure 6:
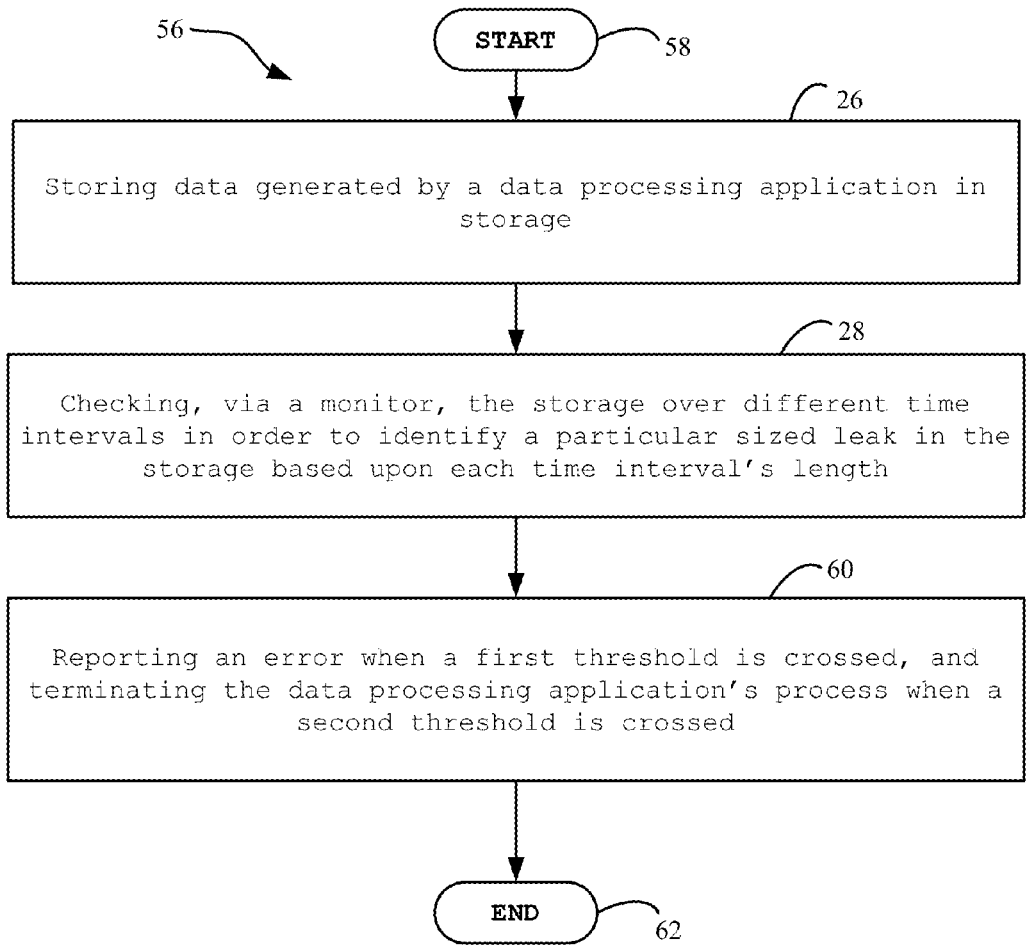
FIG. 6 is a flowchart illustrating method aspects according to the method of FIG. 2.

In another method embodiment, which is now described with reference to flowchart 56 of FIG. 6, the method begins at Block 58. The method may include the steps of FIG. 2 at Blocks 26 and 28. The method may additionally include reporting an error when a first threshold is crossed, and terminating the data processing application's process when a second threshold is crossed at Block 60. The method ends at Block 62.

Figure 7:
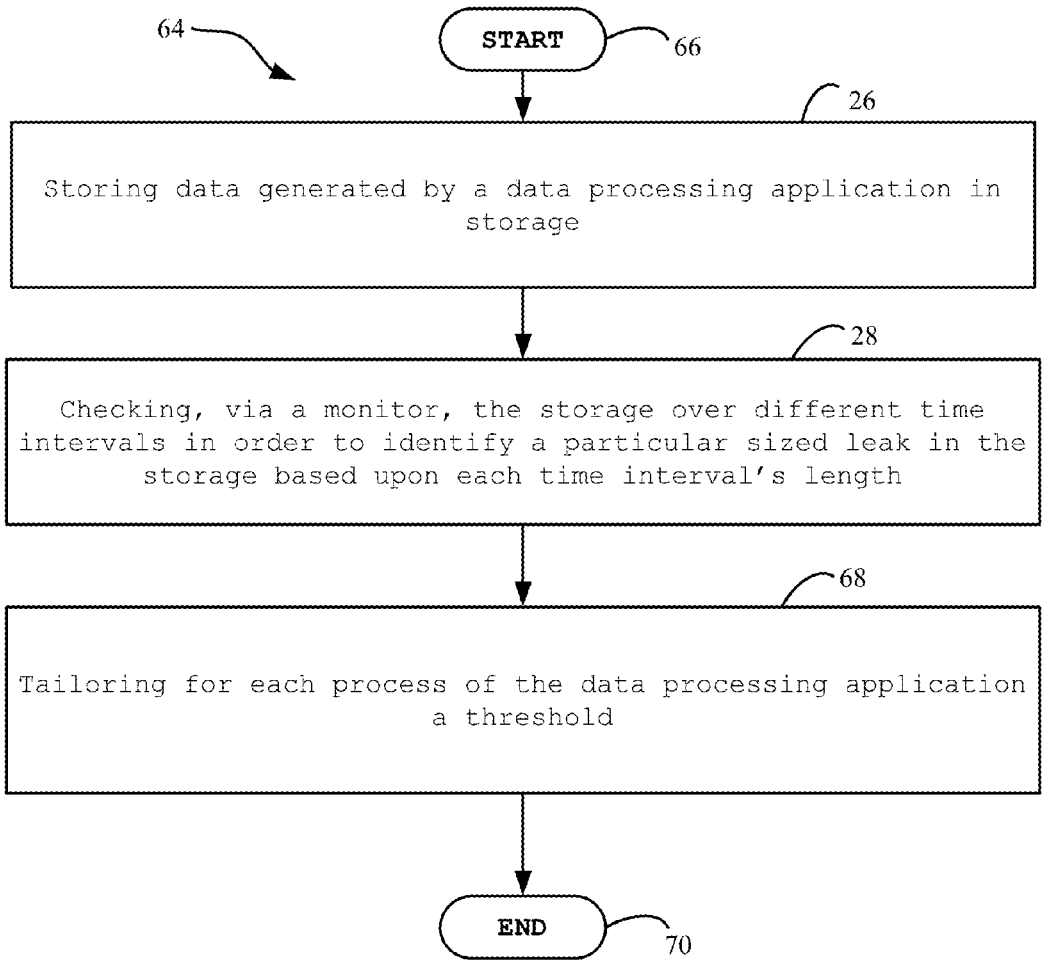
FIG. 7 is a flowchart illustrating method aspects according to the method of FIG. 2.

In another method embodiment, which is now described with reference to flowchart 64 of FIG. 7, the method begins at Block 66. The method may include the steps of FIG. 2 at Blocks 26 and 28. The method may additionally include tailoring for each process of the data processing application a threshold at Block 68. The method ends at Block 70.

Another aspect of the invention is a computer readable program codes coupled to tangible media that may detect memory leaks. In one embodiment, the computer readable program codes may be configured to cause the program to store data generated by a data processing application 12 in storage 16. In another embodiment, the computer readable program codes may also check, via a monitor 18, the storage 16 over different time intervals in order to identify a particular sized leak in the storage based upon each time interval's length.

In view of the foregoing, the system 10, in one embodiment, detects leaks in storage 16 by implementing several filters, running simultaneously or separately, looking for leaks of different rates. As a result, the system 10 can react more aggressively for apparent faster leaks.

The system 10 also reduces false positives during the detections of memory leaks. For instance, the initial algorithm for detection of memory leaks in the Monitor is that a memory leak is indicated if the process grows in virtual memory usage for x out of the last y checks where the checks are 6 hours apart (and x and y are configurable in one embodiment as 6 of 8). This is a fine algorithm for detecting memory leaks in some processes, but some processes grow over time, or in spurts, and this growth is not a memory leak, but the intended design of the program. The Java virtual machine ("JVM") is an example of such, and a JVM can sometimes grow for 6 out of 8 checks, that are 6 hours apart, without the growth being attributed to a memory leak bug. In addition, the detection of memory leaks, without false positives, is important for a system, which is striving to become an Autonomic Element within the autonomic computing architecture.

In one embodiment, to determine if a process is leaking memory, system 10 uses an algorithm that attempts to discover the leak as quickly as possible and without false positives (i.e. where a false positive is determining that there is a memory leak without one actually existing). The algorithm consists of a sequence of checks. In one embodiment, a method ProcessCheck (x1,y1,z1,b1) returns true if the virtual address space increases at least x1 times out of y1 checks and where the seconds duration between the checks is z1 and b1 is the minimum number of bytes that have to be increased. False is returned if the specified increase does not occur.

In one embodiment, the system 10 algorithm is coded such that large memory leaks are detected quickly before they cause the system to become unstable, but at the same time, it can detect smaller memory leaks, if observed over a prolonged period of time, before they cause the system 10 to become unstable. In addition, the algorithm limits false positives and does not significantly impact the performance of the system 10.

For example, if a single ProcessCheck (48, 48, 60*60, 3*1024*1024) rule was defined, then a large memory leak could be detected but it would probably not catch a small memory leak. Conversely, if a single ProcessCheck (24, 24, 6*60*60, 5*1024*1024) rule was defined, then a large memory leak would probably cause the system to become unstable before the leak could be detected.

In the monitoring phase in one embodiment, the system 10 periodically runs and gathers resource information. Then it analyzes the data and determines whether a problem exists. In the plan and execute phases, a set of actions is determined and performed. For example, upon detection of a problem, first failure data capture ("FFDC") information is collected and saved, and a notification of the service being required is generated. In some cases, the monitor 18 will also initiate a recovery action or actions.

The recovery actions may include erasing selected files and terminating programs. Programs that are deemed noncritical are eligible for termination unless the overall system 10 resources are so low that terminating the program is preferable to problems that would occur if the entire system 10 ran out of that resource.

The system 10, under certain conditions, enables programs with unhealthy amounts of resource utilization to be terminated. Also, when a problem occurs, instead of just knowing that there is a problem, sufficient data is captured from multiple sources to enable a supervisor to later investigate the problem and correct any bug, e.g. firmware, software, or the like, without requiring a recreation of the problem. In addition, programmatic control of the monitor 18 and its thresholds is provided.

In one embodiment, the thresholds are relative, that is, instead of absolute values, they are expressed as a percentage of the capacity of a resource. For instance, the threshold for the total amount of storage 16, e.g. memory (RAM plus swapped memory), is also a percentage. If the amount of the RAM or the swap space changes, it does not require a change in the properties file. In another embodiment, absolute thresholds include those related to memory usage within a process.

In one embodiment, many different types of resources and usage characteristics are checked with each iteration of the monitor's 18 checking loop. In another embodiment, the checks described in the following sections are performed on every loop.

In one embodiment, the monitor 18 checks that the amount of free storage 16 (RAM plus swap space) must be at least a minimum percentage. It also checks that the total amount of free space in the swap area is above a minimum threshold and the total swap size is above a minimum. Together, these two checks ensure that the swap area is accessible and functioning as expected, for example. With these monitor 18 checks, system 10 can quickly identify a problem rather than waiting for the system to run low on memory.

In one embodiment, the percentage of free storage 16 in a JVM is checked. For each process, the amount of real and virtual memory used is checked. In another embodiment, there is one threshold for reporting an error and a second set of higher thresholds that, if exceeded, cause system 10 to terminate the offending process.

In one embodiment, in addition to the data directly collected, existing firmware in the monitor 18 then captures data from the terminating process. Also, the existing firmware may restart the data processing application 12 if it is critical enough.

In one embodiment, the thresholds for a data processing application 12 process can be tailored to each process. Regular expressions are used to match the line in the properties file with the name of the process. This allows a process to be assigned unique thresholds and ensures that all processes have a threshold, for example.

In one embodiment, in addition to checking on every loop, a snapshot of the usage is stored in a table periodically at a longer interval, called the snapshot interval (currently once every 6 hours). It is then analyzed for memory leaks. The algorithm is fairly straightforward: A process is deemed to be leaking if over the last n snapshots (currently n=8, which means the code is looking at the last 48 hours of data), its memory usage has increased m times (currently m=7) and it has never gone down. The one process that is skipped for this analysis is the Java Virtual Machine. In one embodiment, a JVM loads in classes only as needed, so it takes a very long time (longer than 48 hours) for it to stop increasing in size.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
   a data processing application executing via a computer processor;
   storage to store data generated by said data processing application; and
   a monitor executing via the computer processor that checks said storage over different time intervals in order to identify a particular sized memory leak in said storage based upon each time interval's length of time, wherein the monitor simultaneously uses the plurality of different time intervals per the data processing application to check for memory leaks.

2. The system of claim 1 further comprising:
   wherein said monitor uses at least one of a first time interval to identify first sized memory leaks, a second time interval to identify second sized memory leaks, and a third time interval to identify third sized memory leaks;
   wherein the first time interval is shorter than the second time interval and the second time interval is shorter than the third time interval; and
   wherein the first sized memory leaks are larger than the second sized memory leaks, and the second sized memory leaks are larger than the third sized memory leaks.

3. The system of claim 1 wherein said monitor collects historical data for comparison with future data of a respective time interval to determine if a memory leak exists.

4. The system of claim 1 wherein said monitor checks are based upon a threshold for said storage being used.

5. The system of claim 4 wherein said monitor enables the threshold to be configurable.

6. The system of claim 4 wherein said storage comprises at least one of random access memory, swap space, real memory, and virtual memory.

7. The system of claim 6 wherein said monitor checks that at least one of a total amount of free space in the swap space is above its respective threshold and that total swap size is above its respective threshold.

8. The system of claim 6 wherein said monitor reports an error when a first threshold is crossed, and terminates said data processing application's process when a second threshold is crossed.

9. The system of claim 4 wherein the threshold comprises a percentage of said storage.

10. The system of claim 4 wherein the threshold is tailored for each process of said data processing application.

11. A computer program product embodied in a computer readable storage medium, the computer program product comprising a non-transitory computer-readable medium embodying computer program code, comprising:
    computer readable program codes coupled to the computer readable storage medium to check storage for memory leaks, the computer readable program codes configured to cause the program to:
    store data generated by a data processing application in storage; and
    check, with a monitor, the storage over a plurality of different time intervals in order to identify a particular sized memory leak in the storage based upon each time interval's length of time, wherein the monitor simultaneously uses the plurality of different time intervals per the data processing application to check for memory leaks.

12. The computer program product of claim 11 further comprising program code configured to: use a first time interval to identify first sized memory leaks, a second time interval to identify second sized memory leaks, and a third time interval to identify third sized memory leaks;
    wherein the first time interval is shorter than the second time interval and the second time interval is shorter than the third time interval; and
    wherein the first sized memory leaks are larger than the second sized memory leaks, and the second sized memory leaks are larger than the third sized memory leaks.

13. The computer program product of claim 11 further comprising program code configured to: collect historical data for comparison with future data of a respective time interval to determine if a memory leak exists.

14. The computer program product of claim 11 further comprising program code configured to: check that at least one of a total amount of free space in a swap space is above its respective threshold and that total swap size is above its respective threshold.

* * * * *